United States Patent [19]

Bollinger, Jr. et al.

[11] Patent Number: 5,545,679

[45] Date of Patent: Aug. 13, 1996

[54] POSITIVE TEMPERATURE COEFFICIENT CONDUCTIVE POLYMER MADE FROM THERMOSETTING POLYESTER RESIN AND CONDUCTIVE FILLERS

[75] Inventors: Parker A. Bollinger, Jr., Arden; Denis A. Mueller, Asheville, both of N.C.; James D. B. Smith; Henry A. Wehrli, III, both of Monroeville, Pa.

[73] Assignee: Eaton Corporation, Cleveland, Ohio

[21] Appl. No.: 375,071

[22] Filed: Jan. 17, 1995

Related U.S. Application Data

[63] Continuation of Ser. No. 158,346, Nov. 29, 1993, abandoned.

[51] Int. Cl.$^6$ ............................... C08K 3/04; C08L 67/00
[52] U.S. Cl. ............................ 523/512; 523/513; 523/514; 524/430; 524/444; 524/495; 524/496; 252/502; 252/511
[58] Field of Search ............................ 523/512, 513, 523/514; 524/430, 444, 495, 496; 252/502, 511

[56] References Cited

U.S. PATENT DOCUMENTS

| | | | |
|---|---|---|---|
| 4,545,926 | 10/1985 | Fouts, Jr. et al. | 252/511 |
| 4,647,894 | 3/1987 | Ratell | 338/22 R |
| 4,685,025 | 8/1987 | Carlomagno | 361/106 |
| 4,724,417 | 2/1988 | Au et al. | 338/22 R |
| 4,774,024 | 9/1988 | Deep et al. | 252/511 |
| 4,775,778 | 10/1988 | van Konynenburg et al. | 219/549 |
| 4,857,880 | 8/1989 | Au et al. | 338/22 R |
| 4,910,389 | 3/1990 | Sherman et al. | 219/548 |
| 5,049,850 | 9/1991 | Evans | 338/22 R |
| 5,195,013 | 3/1993 | Jacobs et al. | 361/106 |

OTHER PUBLICATIONS

Carlson, "Thermistors for Overcurrent Protection", *Machine Design*, pp. 161–165, 1981.
Shaland, "Circuit Protectors: Miniature But Mighty", *Machine Design*, pp. 82–84, 88–90, 1991.
Saunders et al., "Conductive Polymers Spark New Ideas", *Machine Design*, pp. 161–165, 1992.
Fang et al., "Conductive Polymers Prolong Circuit Life", *Design News*, pp. 99, 100, 102, 1992.

*Primary Examiner*—Paul R. Michl
*Assistant Examiner*—U. K. Rajguru
*Attorney, Agent, or Firm*—Martin J. Moran

[57] ABSTRACT

An improved PTC current limiting composition has been provided which comprises a chemically cross-linked thermosetting polyester resin and conductive particles dispersed in the resin. The thermosetting polyester resin is selected from the group consisting of polyethylene glycol fumarate, polypropylene glycol adipate fumarate, neopentyl glycol isophthalate fumarate, and neopentyl glycol phthalate fumarate. The conductive additive particles are selected from the group consisting of graphite and/or carbon black. The composition exhibits PTC behavior when cross-linked by a vinyl monomer selected from the group consisting of styrene, vinyl toluene and tertiary butyl styrene. Curing proceeds by free-radical addition across double bonds of the thermosetting polyester resin and is initiated by organic peroxides. Initial gelation which causes cross-linking but not final curing takes about 0.5 to 4 hours at a temperature of about 25° C. to 125° C. The final cure takes about 0.5 to 8 hours at a temperature of about 100° C. to 160° C. An effective amount of alumina trihydrate can be added to the current limiting composition to prevent dielectric breakdown, arcing and carbon tracking under high voltage conditions.

It is respectfully submitted that the MPEP 608.01(b) states that abstracts should be between 50 and 250 words and up to 25 lines. Applicants' abstract in within these limits.

17 Claims, 3 Drawing Sheets

5,545,679

POSITIVE TEMPERATURE COEFFICIENT CONDUCTIVE POLYMER MADE FROM THERMOSETTING POLYESTER RESIN AND CONDUCTIVE FILLERS

This application is a continuation of Ser. No. 08/158,346, filed on Nov. 29, 1993, now abandoned.

BACKGROUND OF THE INVENTION

1. Field of the Invention

This invention relates to a novel positive temperature coefficient (PTC) thermosetting polyester composition which has a low resistivity and temperature rise when used as a circuit component carrying normal current. When the current increases due to short circuit or overload, the composition temperature increases and changes to a high resistance state which limits the current to a safe value until the current is interrupted. When the current is interrupted, the material cools and reverts back to its original low resistance state. This invention has a specific application as a resettable fuse or current limiter.

2. Background Information

Particularly useful devices comprising PTC conductive polymers are circuit protection devices. Such devices have a relatively low resistance under normal operating conditions of the circuit, but are "tripped," or converted to a high resistance state when excessive current or temperature occurs. When the high resistance is caused by excessive current, the current passing through the PTC element causes it to self-heat to an elevated temperature at which it is in the high resistance state. The increase in resistance is accompanied by an expansion of the PTC element.

Conductive polymer compositions exhibiting PTC behavior, and electrical devices comprising them are well known. For instance, PTC devices have been utilized as current limiters connected in series with the separable contacts of a current interrupter such as a circuit breaker. The PTC device prevents the short circuit current from reaching a level at which the circuit breaker becomes incapable of interrupting this current due to the inability to extinguish the arc struck between the separated contacts. Various PTC compositions and electrical devices incorporating them are shown for example in U.S. Pat. Nos. 5,049,850; 5,195,013; 4,724,417; 4,545,926; 4,685,025; 4,647,894; 4,857,880; 4,910,389; 4,774,024; and 4,775,778.

Articles have also been published in the field such as "Thermistors For Overcurrent Protection," Machine Design, Dec. 10, 1981, pp. 161–165; "Conductive Polymers," Machine Design, Oct. 22, 1992, p. 161; "Circuit Protectors," Machine Design, Dec. 12, 1991, p. 82 and "Conductive Polymers," Design News, Nov. 9, 1992, p. 99.

SUMMARY OF THE INVENTION

A novel and improved PTC conductive polymeric composition has been provided which uses thermosetting polyester resin combined with conductive particles of graphite and/or carbon black as a current limiting composition which has many technical advantages over the current state of the art. The polyester resin used in this invention exists in both the thermoplastic and thermosetting states. The thermoplastic state gives it a glass transition temperature which is necessary for the polymer to exhibit PTC characteristics. The fact that it exists also as a thermosetting material means that it can be cross-linked without radiation which is required for some other conductive polymers. This improved PTC composition is useful in current limiters where curing with radiation is neither desirable nor necessary, therefore making it easier to manufacture.

This improved PTC current limiting composition comprises a chemically cross-linked thermosetting polyester resin and conductive particles dispersed in the resin. The thermosetting polyester resin is selected from the group consisting of polyethylene glycol fumarate, polypropylene glycol adipate fumarate, neopentyl glycol isophthalate fumarate, and neopentyl glycol phthalate fumarate. The conductive additive particles are selected from the group consisting of at least one of graphite and/or carbon black. The composition exhibits PTC behavior when cross-linked by a vinyl monomer. The vinyl monomer cross-linker is selected from the group consisting of styrene, vinyl toluene and tertiary butyl styrene. Curing proceeds by free-radical addition across double bonds of the thermosetting polyester resin and is initiated by organic peroxides. Initial gelation which causes cross-linking but not final curing takes about 1 to 4 hours at a temperature of about 25° C. to 125° C. The final cure takes about 0.5–8 hours at a temperature of about 100° C. to 160° C. An effective amount of alumina trihydrate can be added to the current limiting composition to prevent dielectric breakdown, arcing and carbon tracking under high voltage conditions.

BRIEF DESCRIPTION OF THE DRAWINGS

A full understanding of the invention can be appreciated from the following detailed description of the invention when read with reference to the accompanying graphs.

DESCRIPTION OF THE PREFERRED EMBODIMENT

Figure 1:
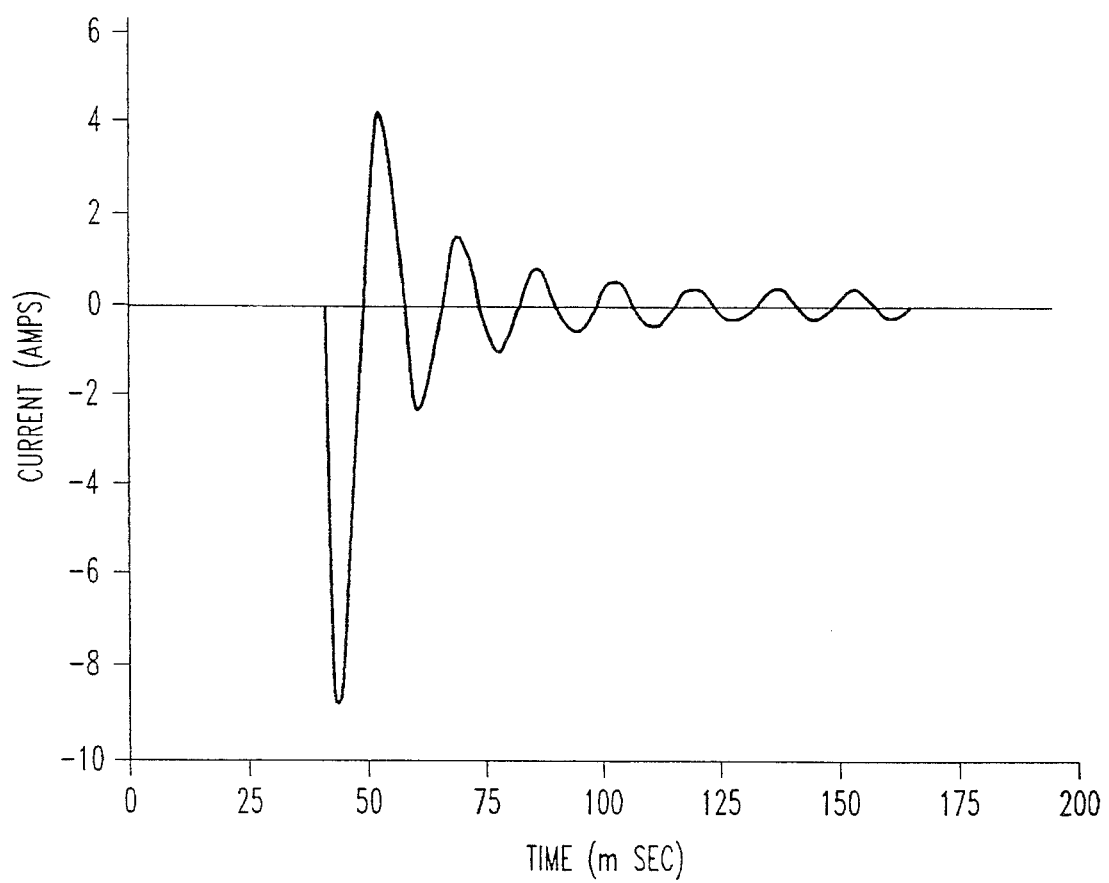
FIG. 1 is a graph of current through a PTC polymer verses time for a 0.300×0.215×0.700 sample of polyester resin with carbon black and alumina trihydrate.

The novel PTC thermosetting polyester composition of this invention has low resistivity and temperature rise when used as a circuit component carrying normal current. When the current increases due to short circuit or overload, the composition temperature increases and changes to a high resistance state which limits the current to a safe value until the power is removed. When the power is removed, the material cools and reverts back to its original low resistance state. This invention has specific application as a resettable fuse or current limiter.

The current limiter of this invention is made from a PTC component composed of a cross-linked conductive polymer composition which exhibits PTC behavior and which comprises a polymeric component comprising a thermosetting polyester resin and conductive particles dispersed in the thermosetting polyester resin and two electrodes which are electrically connected to the PTC component. The two electrodes are utilized to connect the device in series in the electric circuit to be protected. The process to make the PTC component comprises the steps of mixing in a deep container the thermosetting polyester resin with conductive particles, a vinyl monomer cross-linker and an initiator. A vacuum is drawn on the mixture to reduce the porosity of the PTC component. The PTC component is heated for about 0.5 to 4 hours at about 25° C. to 125° C. to gelation which causes the required cross-linking. The PTC component is then heated for about 0.5 to 8 hours at about 100° C. to 160° C. to final cure. The thermosetting polyester resin is selected from the group consisting of polyethylene glycol fumarate, polypropylene glycol adipate fumarate, neopentyl glycol isophythalate fumarate, trimethylene glycol adipate fumarate, and neopentyl glycol phthalate fumarate, and the conductive particles are at least one of graphite and carbon black. The typical loading of the conductive particles in the thermosetting polyester resin is about 10% to 60% by weight and preferably 20% to 40% by weight. The cross-linking vinyl monomer is selected from the group consisting of styrene, vinyl toluene and tertiary butyl styrene and the vinyl monomer is about 25% to 75% by weight of the polyester resin. Curing proceeds by free-radical addition across the double bonds of the thermosetting polyester resin and is initiated by organic peroxides. The initiator is selected from the group consisting of methyl ethyl ketone peroxide, benzoyl peroxide, dicumyl peroxide, tertiarybutyl perbenzoate and 2,5 dimethyl -2,5 bis-(benzoylperoxy) hexane. The initiator is about 1% to 2% by weight of the vinyl monomer cross-linked polyester resin. Co-accelerators can be added to give a faster cure at a lower temperature. The co-accelerators are at least one of benzoyl dimethyl amine (BDMA) and cobalt naphthenate and are about 0.25% to 1.0% by weight of the vinyl monomer cross-linked/resin polyester. An effective amount of alumina trihydrate can be added to the current limiting composition to prevent dielectric breakdown, arcing and carbon tracking under high voltage conditions. The effective amount is in the range of about 5 to 25% by total weight and preferably about 11 to 14% by total weight.

EXAMPLE 1

Six grams of polypropylene glycol adipate fumarate and 4 grams of graphite were mixed with 25% by resin weight of styrene and 1% by vinyl monomer cross-linked polyester resin weight methyl ethyl ketone peroxide and 0.25% by vinyl monomer cross-linked polyester resin weight BDMA. A vacuum of 380 mm Hg was drawn on the mixture to reduce the porosity of the PTC component by allowing better packing of carbon in the intermolecular structure. The initial cure (gelatin) occurred by heating at 60° C. for four hours. The final cure (post cure) occurred by heating for one hour at 100° C. The PTC component of the current limiter was then put in a test circuit which consisted of a 120 volt power source, and a variable auto transformer used to vary the voltage and the current. In this example, a 0.1 ohm shunt resistor was used to measure the current through the current limiter and a push button was used to open and close the circuit. As the current/time increases, the temperature/resistance increases. This is also a function of temperature and not just current. The results of this test are tabulated in Table A below.

TABLE A

| | $I_1$ amps | $I_2$ amps | $\Delta$ Time |
|---|---|---|---|
| 1. | .11 amps | — | 2 minutes - no change |
| 2. | .18 amps | — | 2 minutes - no change |
| 3. | .25 amps | — | 2 minutes - no change |
| 4. | .30 amps | — | 2 minutes - no change |
| 5. | .35 amps | .32 | 2 minutes - gradual change |
| 6. | .40 amps | .33 | 2 minutes - gradual change |

TABLE A-continued

| | $I_1$ amps | $I_2$ amps | $\Delta$ Time |
|---|---|---|---|
| 7. | .45 amps | .32 | 2 minutes - gradual change |
| 8. | .50 amps | .34 | 1 minute - gradual change |
| 9. | .60 amps | .33 | 1 minute - gradual change |
| 10. | .65 amps | .32 | 36 seconds |
| 11. | .70 amps | .32 | 51 seconds |
| 12. | 1.615 amps | .32 | 12 cycles approx. |

In the table above, a constant voltage was applied. $I_1$ is the initial current in amps. $I_2$ is the current recorded at time $\Delta T$. At current values up to 0.3 amps there was no appreciable change in resistance. As the current increased, the resistance increased gradually resulting in a small reduction in current. At higher current levels, there was a more rapid transition to a high resistance state resulting in a significant reduction in current. In test twelve, the initial current went from 1,615 amps to 0.32 amps in approximately 12 cycles of the ac current producing a ratio of unlimited current to limited current of 5 to 1. Initial resistance of the PTC material was 12.7 ohms and the final resistance was 19.2 ohms after approximately 12 cycles.

EXAMPLE 2

To the resin-carbon black mixture in Example 1 above, 12.2% by total weight of alumina trihydrate was added. The PTC component was made and tested by the procedure given above in Example 1. As the current/time increases, the temperature/resistance increases. This is a function of temperature and not just current. The results of this test are tabulated in Table B below and shown in FIG. 1.

TABLE B

| Wave # | Volts | $I_1$ | $I_2$ | Time (ms) | Ratio $I_1/I_2$ |
|---|---|---|---|---|---|
| 1 | 10 | .61 | .61 | 197 | |
| 2 | 20 | 1.30 | 1.07 | 261 | |
| 3 | 30 | 2.15 | 1.07 | 191 | |
| 4 | 40 | 2.81 | .7 | 213 | |
| 5 | 50 | 3.48 | .6 | 206 | |
| 6 | 60 | 3.99 | .5 | 180 | |
| 7 | 70 | 4.71 | .5 | 179 | |
| 8 | 80 | 5.60 | .3 | 170 | |
| 9 | 90 | 6.0 | .25 | 130 | 24:1 |
| 10 | 100 | 6.6 | .38 | 159 | |
| 11 | 110 | 7.0 | .64 | 131 | |
| 12 | 120 | 8.8 | .25 | 136 | 35:1 |
| 13 | 130 | 8.2 | .25 | 121 | |
| 14 | 140 | 8.3 | .38 | 213 | |

In Table B above, the voltage was held constant for each run. $I_1$ is the initial current in amps produced with the voltage indicated and $I_2$ is the current at the time indicated after application of the constant voltage. As the current increased, the resistance increased gradually resulting in small reduction in current at higher current levels. There was a more rapid transition to a high resistance state resulting in a significant reduction in current. In wave #9, the initial current went from 6.0 amps to 0.25 amps producing a ratio of unlimited current to limited current of 24:1. In wave #12, the initial current went from 8.8 amps to 0.25 producing a ratio of unlimited current to limited current of 35:1. Alumina trihydrate was added to help prevent dielectric breakdown, arcing and tracking during high voltage conditions in the PTC component. The addition of the alumina trihydrate changed the unlimited to limited current ratio from 5:1 to 35:1 in this particular sample.

FIG. 1 shows AC current through a polyester PTC polymer versus time. The mixture contains 30.7% carbon black, 12.2% alumina trihydrate and 57.1% polyester resin (all by weight).

Figure 2:
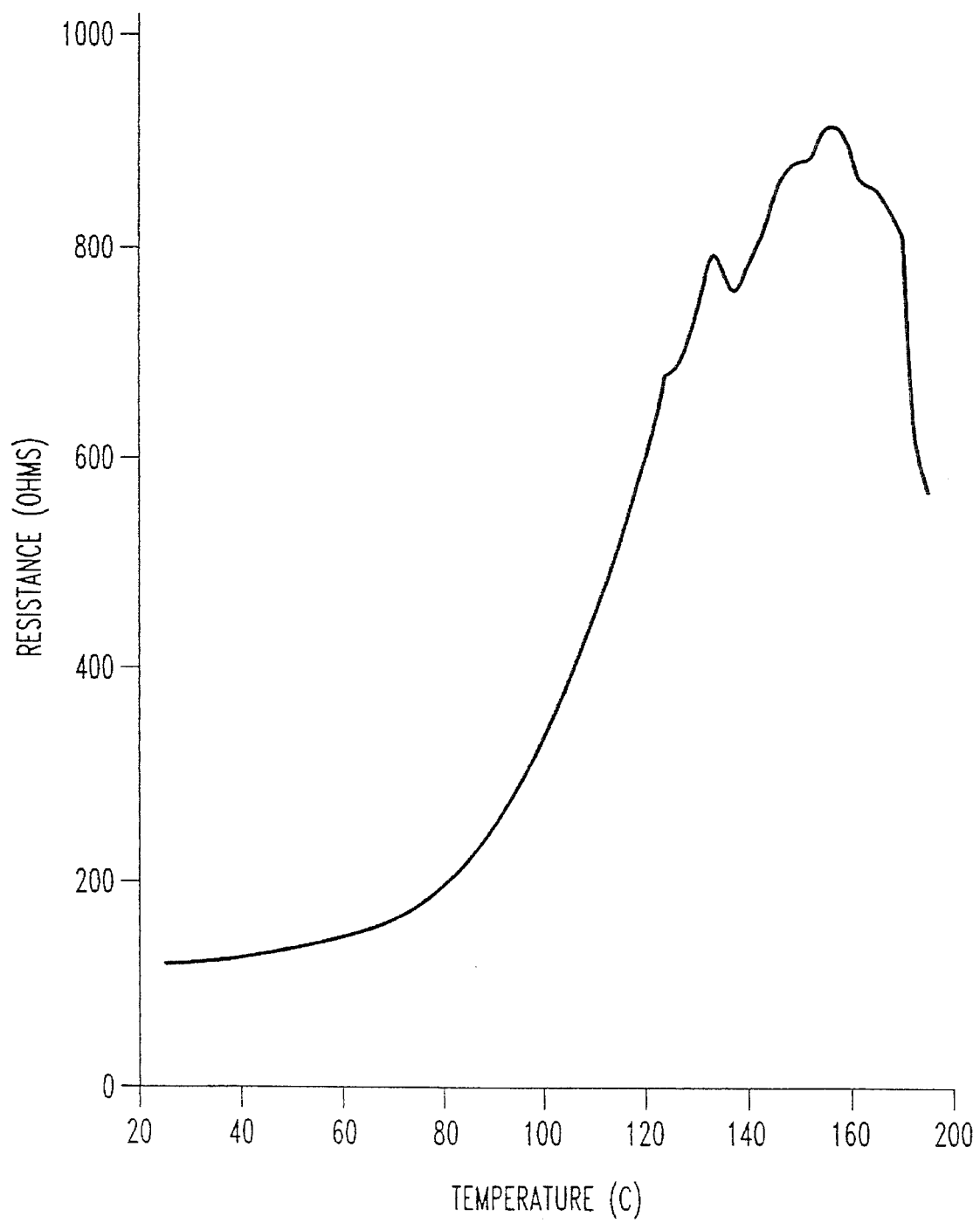
FIG. 2 is a graph of temperature versus resistance for a 0.300×0.215×0.700 sample of the polyester resin and carbon black and/or graphite.

FIG. 2 shows temperature versus resistance in ohms for a 0.300×0.215×0.700 sample for a mixture containing 3% carbon black, 42% graphite and 55% polyester resin (all by weight). The PTC characteristics of the polymer is shown by FIG. 2 where resistance increases as the temperature rises.

Figure 3:
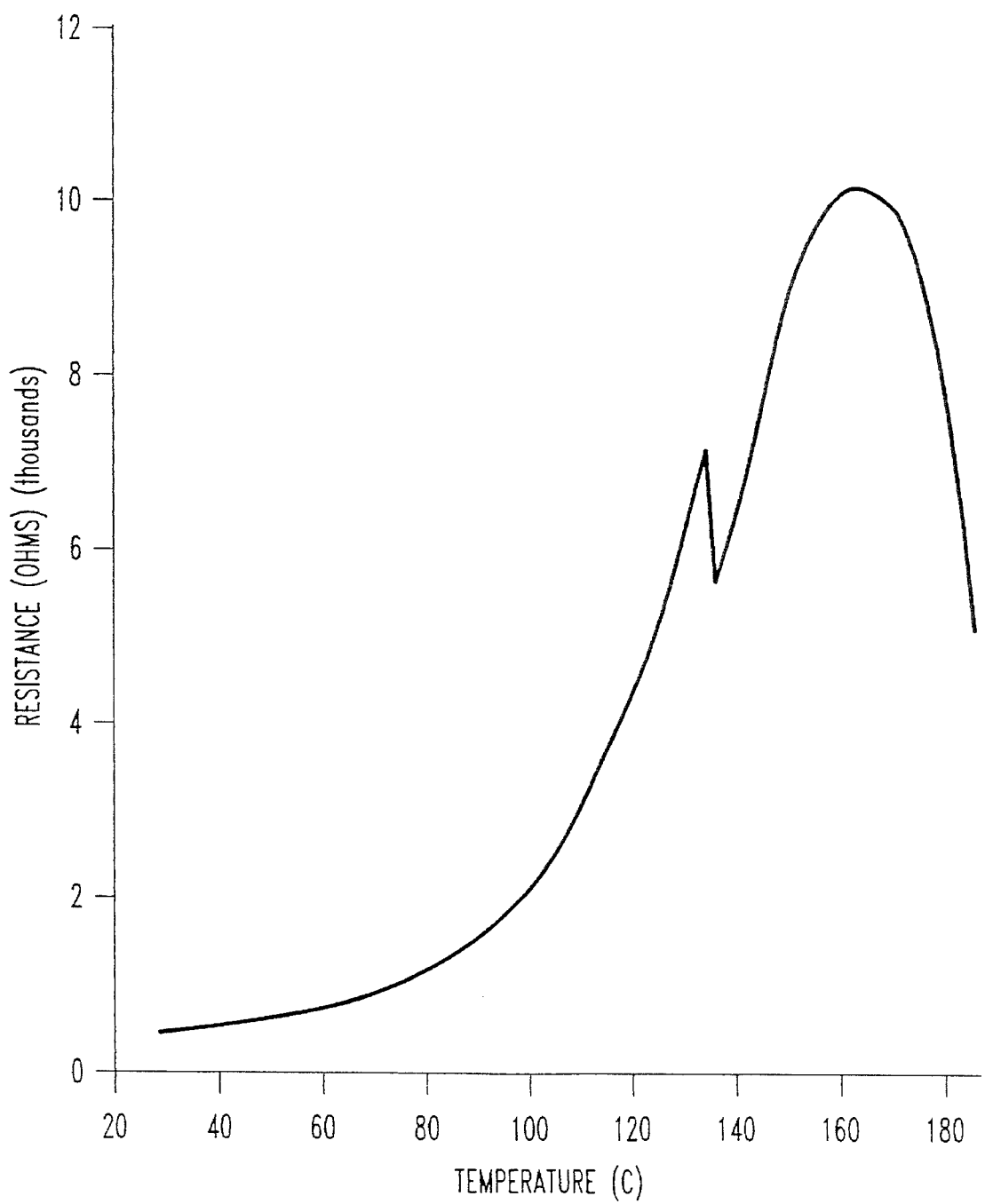
FIG. 3 is a graph of temperature versus resistance for a 0.300×0.215×0.700 sample of the polyester resin with carbon black.

FIG. 3 shows temperature versus resistance for a mixture where $R_{max}/R_{min}$–21.3 and the mixture contained 33.5% carbon black and 66.5% polyester resin by weight. The PTC characteristics of the polyester resin is shown by FIG. 3 wherein resistance increases as the temperature rises.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims.

We claim:

1. A current limiting composition which comprises:
   a thermosetting polyester resin selected from the group consisting of polyethylene glycol fumarate, polypropylene glycol adipate fumarate, neopentyl glycol isophthalate fumarate, trimethylene glycol adipate fumarate, and neopentyl glycol phthalate fumarate, chemically cross-linked during polymerization with a vinyl monomer resin comprising an initiator and conductive additive particles dispersed therein.

2. The composition of claim 1, wherein the conductive additive particles are selected from the group consisting of at least one of graphite and carbon black.

3. The composition of claim 2, wherein a typical loading of said conductive additive particles in the thermosetting polyester resin is about 10% to 60% by weight.

4. The composition of claim 2, wherein said typical loading is about 20% to 40% by weight.

5. The composition of claim 4, wherein said composition exhibits PTC behavior.

6. The composition of claim 5, wherein the vinyl monomer is about 25% to 75% by weight of said polyester resin.

7. The composition of claim 6, wherein said vinyl monomer cross-linker is selected from the group consisting of styrene, vinyl toluene and tertiary butyl styrene.

8. The composition of claim 7, wherein the initiator is selected from the group consisting of methyl ethyl ketone peroxide, benzoyl peroxide, dicumyl peroxide, tertiary-butyl perbenzoate, and 2,5 dimethyl-2,5 bis-(benzoyl-peroxy) hexane.

9. The composition of claim 8, wherein the initiator is about 1% to 2% by weight of said vinyl monomer cross-linked polyester resin.

10. The composition of claim 9, wherein gelation which causes cross-linking occurs at temperature of about 25° to 125° C. and takes about 0.5 to 4 hours.

11. The composition of claim 10, wherein the final cure takes about 0.5–8 hours at a temperature of about 100° to 160° C.

12. The composition of claim 11, wherein co-accelerators are added to give a faster cure at lower temperatures.

13. The composition of claim 12, wherein the co-accelerators are at least one of benzoyl dimethyl amine (BDMA) and cobalt paphthenate.

14. The composition of claim 13, wherein the co-accelerators are about 0.25 to 1.0% by weight of said vinyl monomer polyester cross-linked resin.

15. The composition of claim 1, wherein an effective amount of alumina trihydrate is added to prevent dielectric breakdown, arcing and carbon tracking under high voltage conditions.

16. The composition of claim 1, wherein about 5 to 25% by total weight of alumina trihydrate further comprises said current limiting composition.

17. The composition of claim 16, wherein the percentage of alumina trihydrate by weight is about 11 to 14%.

* * * * *